H. VAN DOREN.
MEAT-CHOPPER.
No. 192,099. Patented June 19, 1877.
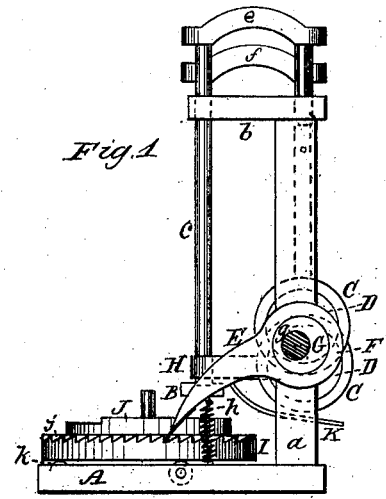
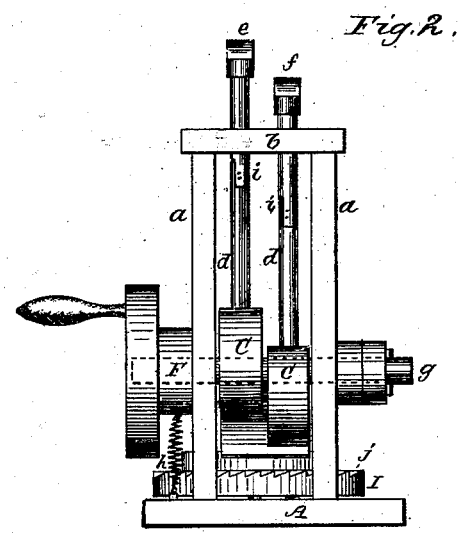
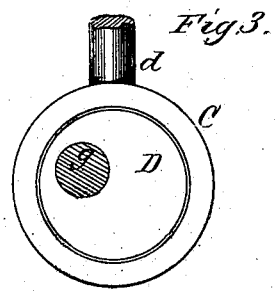
WITNESSES
Nat. E. Oliphant
John L. Condron
INVENTOR
Henry Van Doren,
per Chas. H. Fowler,
Attorney.

UNITED STATES PATENT OFFICE.

HENRY VAN DOREN, OF SOUTH BRANCH, NEW JERSEY.

IMPROVEMENT IN MEAT-CHOPPERS.

Specification forming part of Letters Patent No. 192,099, dated June 19, 1877; application filed April 3, 1877.

*To all whom it may concern:*

Be it known that I, HENRY VAN DOREN, of South Branch, in the county of Somerset and State of New Jersey, have invented a new and valuable Improvement in Vegetable and Meat Choppers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my invention. Fig. 2 is a back end view of the same, and Fig. 3 is a detail view of the sleeve and eccentric of the shafts.

This invention has relation to meat and vegetable choppers; and the object and purpose is to produce a machine of this character simple in construction and effective in operation; and the invention consists in the combination and arrangement of the several parts, as will be hereinafter described and subsequently pointed out in the claim.

In the accompanying drawings, A represents the base or platform, to which are connected two standards, $a$, having secured to their upper ends a guide-board, $b$. Through this guide-board work shafts $c\ c\ d\ d$, the shafts being connected by cross pieces $e\ f$. The shafts $c\ c$ carry double-bladed knives B, and upon the end of the shafts $d\ d$ are annular sleeves C, said shafts being operated by eccentrics D upon a horizontal driving-shaft, $g$. A pawl, E, is also formed with, or having a, sleeve, F, and is operated by an eccentric, G, upon the driving-shaft $g$, and is retained in position by a suitable spring, $h$. It will be noticed that the shafts $d\ d$ are jointed, or, in other words, made of two pieces pivoted together at $i$, and the shafts $c\ c$ are guided near their lower ends by a guide, H, through which they pass; and it will also be noticed that the eccentrics D are so placed in relation to each other upon the horizontal driving-shaft $g$ that each chopping-knife B is brought down alternately upon the meat or vegetables, while the eccentric G operates the pawl E to throw it against the serrations $j$, upon a rotating table, I, and moving said table at every downward stroke of the knife the distance of the width of each serration. A hoop or band, J, is secured to the table I, to hold the meat or vegetables thereon while being chopped, and to give the table easy motion and reduce the friction rollers $k$ are secured to the base or platform A, upon which the table rests and is supported. An apron, K, prevents the particles of meat or vegetables from being thrown onto the eccentrics D and sleeves C, and the band or hoop J also keeps the meat or vegetables from coming in contact with the serrations $j$, upon or near the edge of the table, thereby preventing the possibily of impeding the operation of the machine.

A meat or vegetable chopper constructed as above described can be operated with effect, and the parts are so simple in construction that they can be made strong and durable, and, therefore, not liable to get out of order.

Having now fully described my invention, what I claim as new, and desire to secure by Letters Patent, is—

1. The shafts $c\ c\ d\ d$, with knives B and sleeves C, and the pawl E, with sleeve F, in combination with the driving-shaft $g$ and eccentrics G D, and the rotating table I, substantially as and for the purpose set forth 2. In a meat or vegetable chopper, the table I, with band or hoop J, in combination with the apron K, for the purpose specified.

In testimony that I claim the above I have hereunto subscribed my name in the presence of two witnesses.

HENRY VAN DOREN.

Witnesses:
A. P. SUTPHEN,
J. H. GUMBLE.